United States Patent
Spiridon

(10) Patent No.: US 7,573,240 B2
(45) Date of Patent: Aug. 11, 2009

(54) LOW NOISE CHARGING METHOD AND DEVICE FOR PORTABLE DEVICES

(75) Inventor: Constantin Spiridon, San Jose, CA (US)

(73) Assignee: 02Micro International Limited, Grand Cayman (KY)

(*) Notice: Subject to any disclaimer, the term of this patent is extended or adjusted under 35 U.S.C. 154(b) by 0 days.

(21) Appl. No.: 11/114,691

(22) Filed: Apr. 25, 2005

(65) Prior Publication Data

US 2006/0113962 A1 Jun. 1, 2006

Related U.S. Application Data

(60) Provisional application No. 60/632,362, filed on Dec. 1, 2004.

(51) Int. Cl.
*H02J 7/00* (2006.01)

(52) U.S. Cl. .................. 320/133; 320/139; 320/155

(58) Field of Classification Search .......... 320/133, 320/139, 158, 159, 157, 155
See application file for complete search history.

(56) References Cited

U.S. PATENT DOCUMENTS

| | | | | |
|---|---|---|---|---|
| 3,597,673 A | * | 8/1971 | Burkett et al. ............. | 320/129 |
| 4,314,198 A | * | 2/1982 | Rogers ...................... | 323/351 |
| 4,878,007 A | * | 10/1989 | Gabor et al. ............... | 320/136 |
| 4,902,956 A | * | 2/1990 | Sloan ......................... | 320/135 |
| 5,321,347 A | * | 6/1994 | Chien ......................... | 320/139 |
| 5,825,155 A | * | 10/1998 | Ito et al. .................... | 320/118 |
| 5,828,202 A | * | 10/1998 | Tamai ........................ | 320/141 |
| 6,064,179 A | * | 5/2000 | Ito et al. .................... | 320/128 |
| 6,130,813 A | * | 10/2000 | Kates et al. ............... | 361/93.1 |
| 6,307,353 B1 | * | 10/2001 | Shiojima ................... | 320/139 |
| 6,507,173 B1 | | 1/2003 | Spiridon et al. ........... | 320/162 |
| 6,650,089 B1 | * | 11/2003 | Freeman et al. ........... | 320/132 |
| 6,897,635 B2 | * | 5/2005 | Ozawa et al. .............. | 320/127 |
| 6,949,911 B2 | * | 9/2005 | Laig-Hoerstebrock et al. ........................... | 320/132 |
| 2004/0032238 A1 | * | 2/2004 | Miyagi ....................... | 320/166 |
| 2004/0090209 A1 | * | 5/2004 | Nishida et al. ............. | 320/149 |
| 2005/0237032 A1 | * | 10/2005 | Tan et al. ................... | 320/166 |

FOREIGN PATENT DOCUMENTS

| | | |
|---|---|---|
| CN | 2069178 | 1/1991 |
| CN | 1111844 | 11/1995 |
| CN | 1167168 | 12/1997 |
| CN | 1308380 | 8/2001 |

* cited by examiner

*Primary Examiner*—Akm E Ullah
*Assistant Examiner*—Samuel Berhanu

(57) ABSTRACT

A method is used for charging a battery. According to the method of the present invention, the battery is first charged to a predetermined voltage at a substantially constant current. Then, the charging current is disabled. A pulsing current is applied to the battery for charging the battery.

25 Claims, 4 Drawing Sheets

LOW NOISE CHARGING METHOD AND DEVICE FOR PORTABLE DEVICES

CROSS REFERENCE TO PROVISIONAL APPLICATION

This application claims priority to the provisional patent application Ser. No. 60/632,362, entitled "Low Noise Charging Method for Portable Devices," with filing date Dec. 1, 2004, and assigned to the assignee of the present invention, which is herein incorporated by reference in its entirety.

BACKGROUND OF THE INVENTION

1. Field of the Invention

The present invention relates to the field of battery management, and more particularly to the field of battery management integrated circuits supporting portable devices. Specifically, the present invention relates to a low noise Charging method and device for portable devices.

2. Description of the Related Art

Generally, there are many charger ICs for Li-Ion or Ni—Cd batteries, starting form an external AD-DC adapter. Most of them use external power transistors to supply the charge current to the battery pack, which disadvantageously lead to large occupied area on the PCBs (printer circuit board).

A very popular approach is the linear charger, where a constant voltage current limited supply is used to charge the battery. The main drawback is that the serial regulator from the power supply has to be able to dissipate a large power. This implies the use of a big power transistor, which is not preferred in portable devices because of the large size and PCB area consuming.

There are other discrete solutions that use an external transistor to switch on and off, controlled by a microprocessor and additional circuitry to measure the battery voltage. These have the drawback of a high cost and a big PCB area. Still other solutions use a DC-DC buck converter to charge the battery. They have the drawback of a high noise generated in the system during charging, a high cost and special mechanical enclosures that have to be used to fulfill the EMI specifications. There are too some less expensive hysteresis chargers that have the drawback of a high noise generated at the end of charge. This perturbs the normal operation of the wireless portable devices.

Accordingly, there exists a need for a charging system or circuit which is able to overcome the above mentioned drawbacks.

SUMMARY OF THE INVENTION

It is an object of the present invention to provide a low noise charging method and device for portable devices. Specifically, a method and system is described that provides for a single chip battery charger or a separate block inside a power management unit IC (integrated circuit). The present invention applies to cellular phones, wireless phones, personal digital assistants (PDA), etc.

In order to achieve the above object, the present invention provides a method for charging a battery. According to the method of the present invention, the battery is first charged to a predetermined voltage at a substantially constant current. Then, the charging current is disabled. A pulsing current is applied to the battery for charging the battery.

BRIEF DESCRIPTION OF THE DRAWINGS

Other objects, advantages, and novel features of the invention will become more apparent from the following detailed description when taken in conjunction with the accompanying drawing.

DESCRIPTION OF THE EMBODIMENT

Reference will now be made in detail to the preferred embodiments of the present invention, low noise charging methods for portable devices. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
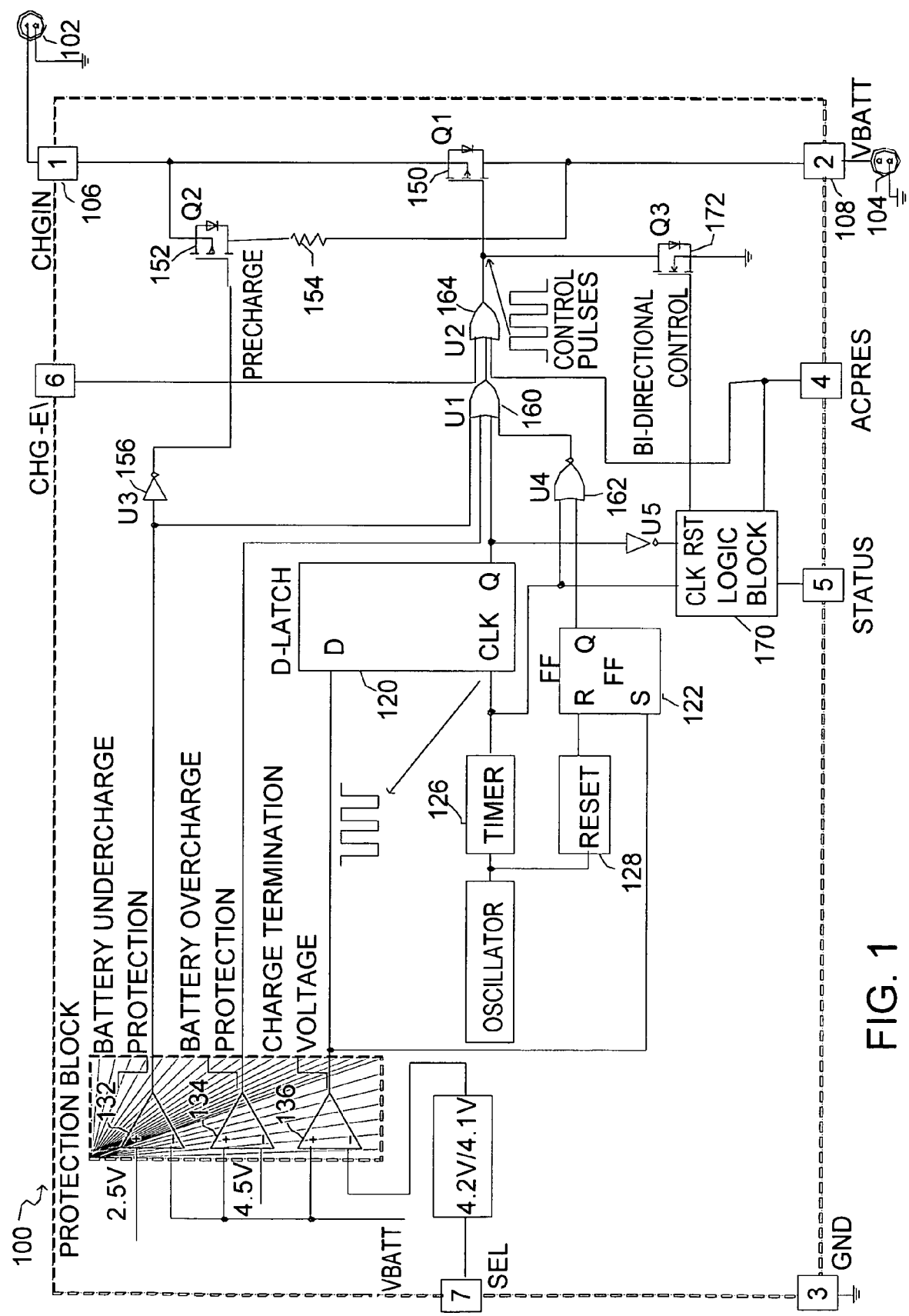
FIG. 1 is a block diagram of a charging system for charging a battery according to one embodiment of the present invention.

Referring to FIG. 1, a charging system 100 according to an embodiment of the present invention is illustrated. In the present embodiment, the charging system 100 includes a charge-in end 106 to be coupled to a AC-DC adapter 102 and a battery end 108 to be coupled to a battery 104 such that the charging system 100 controls the charging process of the battery 104. While not wishing to be bound by example, the following detailed description will be proceed with reference to a Li-ion battery as the battery 104 for the circuit of the present invention. However, it will be apparent that the present invention is not limited only to charging a Li-ion battery, rather, the present invention should be broadly construed as a charging circuit and methodology independent of the particular battery for a particular application.

The charging system 100 according to the embodiment of the present invention comprises a switch 150 for coupling the charge-in end 106 to the battery end 108 in order to enable or disable the charging voltage from the adapter 102 to the battery 104. The charging system 100 further comprises a bypass switch 152 for coupling the charge-in end 106 to the battery end 108 through a resistor 154 so as to form a bypass pre-charge circuit.

Two inputs of a comparator 132 of the charging system 100 are respectively coupled to the battery end 108 and a voltage source of a predetermined voltage or a lower threshold voltage, such as 2.5 volts. When the voltage across the battery 104 is lower than 2.5 volts, the output of the comparator 132 is high or asserted, and then, through an INVERT or a NOT gate 156, the bypass switch 152 is enabled or turned on and, through two OR gates 160 and 164, the switch 150 is disabled or turned off. Therefore, the voltage of the adapter 102 will be applied to the battery 104 through the bypass pre-charge circuit, i.e., through the resistor 154, and the voltage applied to the battery 104 is reduced by the current through the resistor 154 times the resistance of the resistor 154.

The charging system 100 according to the embodiment of the present invention comprises a comparator 134, two inputs of which are respectively coupled to the battery end 108 and a voltage source of a predetermined voltage, such as 4.5 volts for a Li-Ion battery. When the voltage across the battery 104 is higher than 4.5 volts, the output of the comparator 134 is high or asserted, and then, through the OR gates 160 and 164, the switch 150 is disabled. Therefore, the voltage of the adapter 102 will not be applied to the battery 104 so as to prevent the battery 104 from overcharging.

The charging system 100 according to the embodiment of the present invention further comprises a comparator 136, two inputs of which are respectively coupled to the battery end 108 and a voltage source of a predetermined voltage, such as 4.2 volts or 4.1 V for a Li-Ion battery. The charging system 100 comprises a D-latch (D-type flip-flop) 120, the data input (D) of which is coupled to the output of the comparator 136 and the output of which is coupled to the input of the OR gate 160. A timer 126 of the charging system 100 is coupled to the clock input of the D-latch 120.

In the present embodiment according to the present invention, an R-S flip-flop 122 is provided. The reset input and the set input of the R-S flip-flop 122 are coupled to a reset logic block and to the output of the comparator 136, respectively. The output of the R-S flip-flop 122 is coupled to a NOR gate 162.

According to the embodiment of the present invention, while the battery 104 is charged through the charging system 100 with the AC-DC adapter 102, the voltage across the battery is transmitted to the comparators 132, 134 and 136 and the R-S flip-flop 122 will be reset by the reset logic block 128. If the battery voltage is lower than 2.5 volts, as described above, the switch 150 will be disabled and the switch 152 will be enabled. A bypass pre-charge circuit will be actuated to charge the battery 104 with a reduced current.

If the voltage across the battery is higher than 2.5 and lower than 4.2 volts, the outputs of the comparators 132, 134 and 136 are low. Then, the output of the D-latch 120 is low and the output of the R-S flip-flop 122 is high. The output of the NOR gate 162 will be in a low state. The switch 150 is enabled when the OR gate 164 has the other inputs at low, and consequently, the voltage from the adapter 102 is applied to the battery 104. In this stage, the battery will be charged with a current limited by the adapter 102, which is named the constant current phase (CC phase) or the phase I. Once the battery voltage reaches the charge termination voltage, i.e., 4.2 volts, the charging system 100 will start to charge the battery 104 with a low frequency pulsing current, which is named pulse charging phase or the phase II.

Referring to FIGS. 2a-2f, they depict the individual waveforms of the devices in the charging system 100 according to the embodiment of the present invention. Once the voltage of the battery 104 is higher than 4.2 volts, for example, at T1 shown in FIGS. 2a-2f, the output of the comparator 136 will go high. The pulse charging phase or the phase II is actuated. The output of the R-S flip-flop 122 will be latched to be low, and the NOR gate 162 will be enabled. The output of the NOR gate 162, shown in FIG. 2c, will be the inverted pulse of the output pulse of the timer 126, shown in FIG. 2a. During the pulse, i.e., when the output of the timer 126 goes high, the output of the NOR gate 162 is low and the switch 150 is enabled. When the output of the timer 126 is low, the switch 150 is disabled or turned off. The charging current is shut down and the voltage of the adapter 102 is not applied to the battery 104. At the same time, the battery voltage is dropped and below the charge termination voltage, i.e., 4.2 volts. Then, the output of the comparator 136 goes low and the output of the D-latch 120 goes low. Repeatedly, the battery 104 is charged by a short-term current, which is limited by the adaptor 102, during the pulses.

Figures 2A, 2B, 2C, 2D, 2E, 2F:
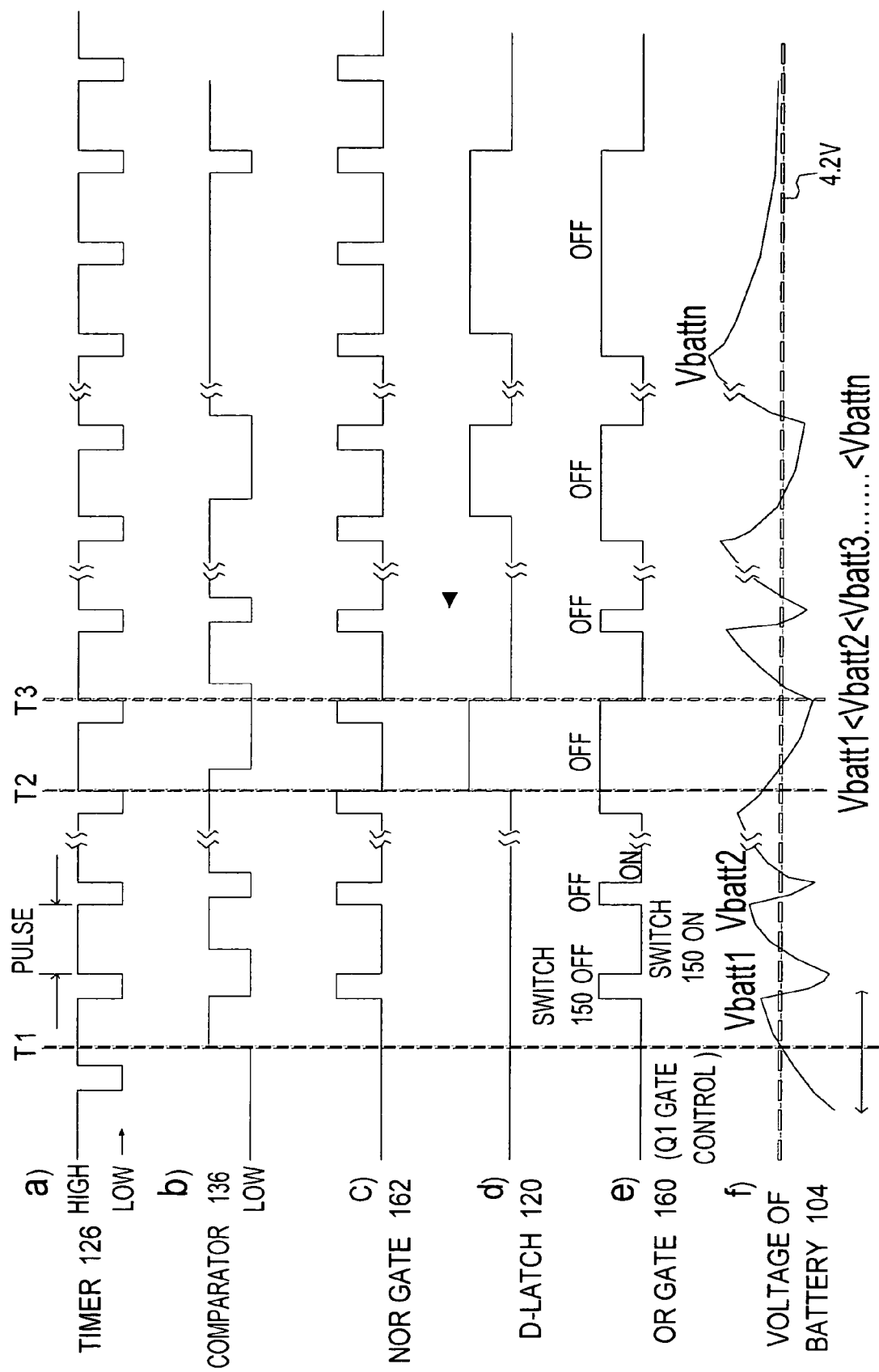
FIG. 2a is the waveform diagram of the output signal of the timer in the charging system shown in FIG. 1.
FIG. 2b is the waveform diagram of the output of the comparators for comparing the battery voltage with a charge termination voltage in the charging system shown in FIG. 1.
FIG. 2c is the waveform diagram of the output of the NOR gate that enables the pulsing charging phase in the charging system shown in FIG. 1.
FIG. 2d is the waveform diagram of the output of the D-latch in the charging system shown in FIG. 1.
FIG. 2e is the waveform diagram of the output of the NOR gate that controls the charging switch in the charging system shown in FIG. 1.
FIG. 2f is the waveform diagram of the voltage of the battery in the charging system shown in FIG. 1.

With the pulse charging the battery, the voltage of the battery 104 will rise higher and higher and the drop of the voltage of the battery 104, between the pulses or while the switch 150 is disabled, will be lesser and lesser, shown in FIG. 2f. After a certain period of time, the drop of the battery voltage is reduced to a certain value, while the switch 150 is disable. In other words, after a certain period of time, at the next rising edge of the output of the timer 126, the battery voltage may be higher than the charge termination voltage, 4.2 volts, for example, at T2 shown in FIGS. 2a-2f. The output of the D-latch 120, shown in FIG. 2d, will go high at the rising edge of the pulse of the timer 126 so as to turn off or disable the switch 150. The voltage of the adapter 102 is not applied to the battery 104, and the charging current is substantially zero.

The voltage of the battery 104 is decreased gradually during the output of the D-latch 120 being high. After a certain number of pulses, for example, at T3 shown in FIGS. 2a-2f, the voltage of the battery 104 may be lower than the charge termination voltage, i.e., 4.2 volts and the output of the comparator 136 will be low. The output of the D-latch 120 will still be kept at high, shown in FIG. 2d, until the output of the timer 126 goes high. After then, the output of the D-latch 120 is low and the switch 150 is enabled. The battery 104 is charged by current pulses in response to the output signal of the timer 126 until the output of the D-latch 120 goes high again.

The OR gate 160 is coupled to the D-latch 120 and the NOR gate 162, so the output of the OR gate 160, shown in FIG. 2e, goes high to turn off the switch 150 when the output of the D-latch 120 or the output of the NOR gate 162 goes high.

A counter in the logic block 170 of the charging system 100 can be used to measure how long or how many pulses the output of the D-latch 120 is high. When the D-latch 120 remains high for a predetermined number of the pulses of the timer 126, i.e., for a predetermined period of time, the battery 104 is considered to be fully charged, and a stop charging signal will be actuated to stop charging the battery.

The charging status is monitored by a logic block 170 in the charging system 100. The inputs of the logic block 170 is coupled to the output of the timer 126 and the output of the D-latch 120. By the present of the pulse signal and the logic value of the output of the D-latch 120, the logic block 170 can output the following states: solid high when the AC-DC adapter is not present, toggling high-low during charging and solid low at end of charging so as to show three different charger states with only an output pin.

Furthermore, the charging system 100 according to the embodiment of the present invention comprises a bi-directional switch 172 coupled to the logic block 170. When the AC-DC adapter 102 is removed from the charge-in end 106 of the charging system 100 and an external battery-driven device is coupled to the charge-in end 106, the charging system 100 can be used to supply electric energy from the battery 104 to the external battery driven device. Since the logic block 170 is able to indicate the charger states, the logic block 170 is also able to enable the bi-directional switch 172 to supply the energy from the battery to the external battery-driven device. A bi-directional device and method have been disclosed in U.S. Pat. No. 6,507,173 B1, which is assigned to the common assignee and incorporated herein by reference.

According to one embodiment of the present invention, the pulse of the timer 126 in the charging system 100 is generated at a very low frequency, such as 1 Hz, so as to avoid generating noise and eliminate the need for additional filtering. The duty cycle ratio of the pulse, Ton (the period of time of the pulse)/T (period), is from about 60% to about 80%. Furthermore, there is not any hysteresis voltage requirement at the comparator 136. Any noise generated at the comparator 136 will be removed by the D-Latch 120 so as to avoid noise generation in the portable equipment.

The adaptor 102 may provide a continuous voltage output. The continuous voltage of the adaptor 102 is continuously applied to the battery 104 during the constant current phase or Phase I, and discontinuously applied to the battery 104 in response to the output pulses of the timer 126 during pulse charging phase or Phase II. The adaptor 102 with a discontinuous voltage also can be used to charge the battery 104 through the charging system 100 according to the embodiment of the present invention. For example, the adaptor 102 may provide an output voltage with half sinusoidal waveform at a frequency of 120 Hz. The discontinuous voltage is still continuously applied to the battery 104 during Phase I, and discontinuously applied to the battery 104 in response to the output pulses of the timer 126 during Phase II. It should be noted that the adapter 102 with a constant continuous voltage or any other waveform voltage, such as a half-sinusoidal waveform voltage, a square waveform voltage or a triangular waveform voltage, can be used to charge the battery 104 through the charging system 100 according to the embodiment of the present invention.

Further, the charging system 100 according to the embodiment of the present invention can work both with the AC-DC adapter having a pulsing output voltage and with the AC-DC adapter having a continuous output voltage. The charging system 100 indicates the presence of the AC-DC adapter, even if the AC-DC adapter output voltage is pulsing, for example, with a frequency higher than 50 Hz. It can be written: IAVE (the average charging current)=Ton/T (duty cycle ratio)× Imax (the maximum charging current), and if Ton/T=0.8, IAVE=0.8 Imax. Similarly, for example, if the capacity of the battery is 650 mAh and the battery is charged at IC (IMAX=650 mA), each pulse will charge 0.144 mAh (0.022% C) so as to prevent to overcharging the battery when charging with a Ton/T=0.8.

Furthermore, the charging system 100 according to the embodiment of the present invention is able to be formed in an integrated circuit (IC) chip or package with a limited count of pins. This IC package is small in dimensions and suitable for attached in a portable electronic device, such as digital cameras, cellular phones, and personal digital assistants.

Figure 3:
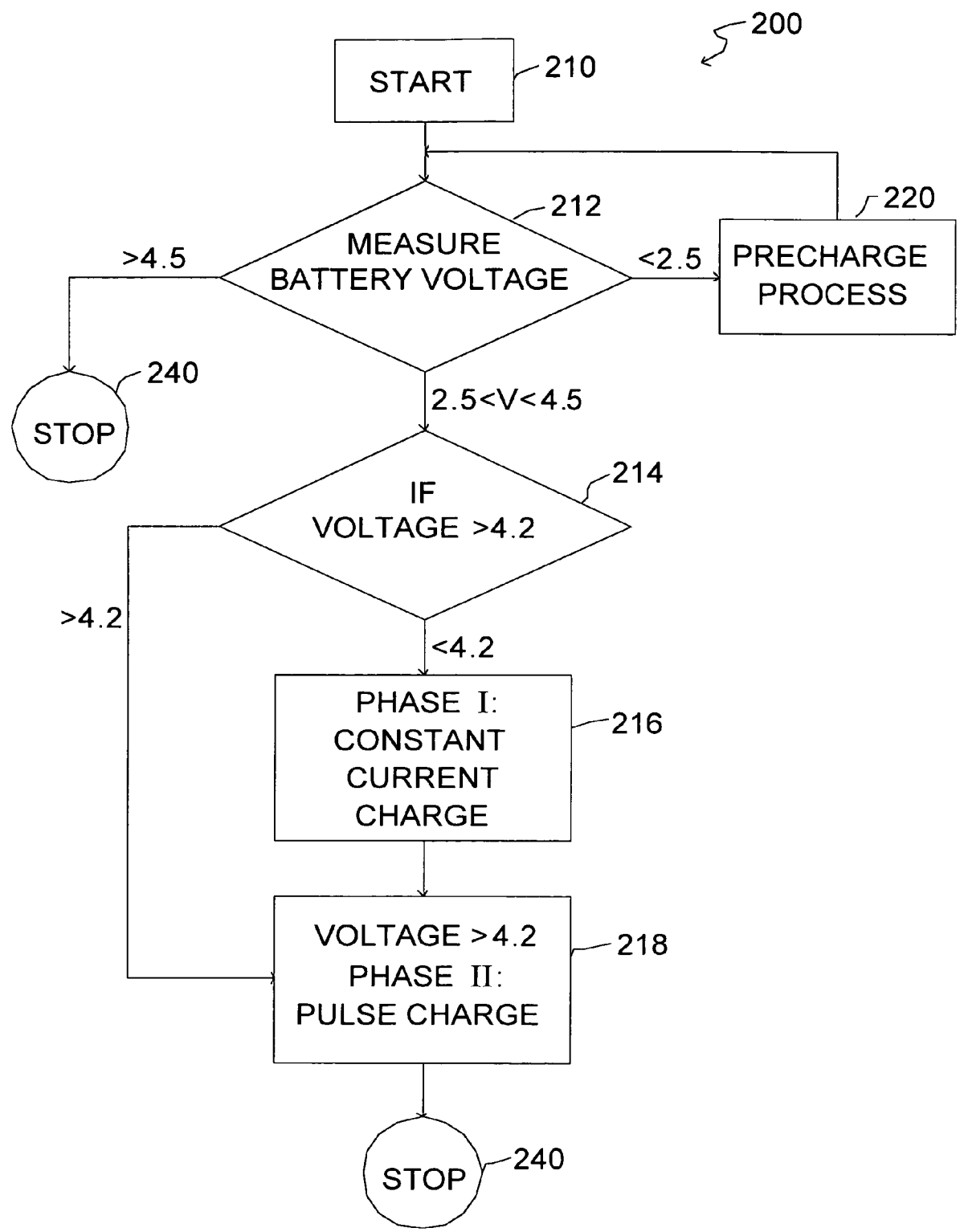
FIG. 3 is the diagram showing a method for charging a battery according to one embodiment of the present invention.

Referring to FIG. 3, a method 200 for charging a battery according to an embodiment of the present invention is illustrated. In a step 210, a battery is being prepared for charging. In a step 212, the voltage of the battery is measured. If the measured voltage of the battery is lower than a lower threshold voltage, such as 2.5 volts, a step 220 will be executed. If the measured voltage of the battery is higher than an overcharge voltage, such as 4.5 volts, a step 240 will be executed to stop charging the battery. In the step 220, the battery will be pre-charged. The battery is charged with a relatively low current, and then a step 212 will be executed. If the measured voltage of the battery is higher than the lower threshold voltage and lower than the overcharge voltage, a step 214 will be executed.

In the step 214, the measured voltage of the battery is compared with a predetermined voltage or a charge termination voltage, such as 4.2 volts for a Li-ion battery. If the measured voltage of the battery is higher than the charge termination voltage, a step 218 will be executed. If the measured voltage of the battery is lower than the charge termination voltage, a step 216 will be executed. In the step 216, the battery will be charged in Phase I, and be charged to a predetermined voltage, e.g., 4.2 volts. That is, the battery is charged with a constant current until the measured voltage of the battery is higher than the charge termination voltage. During this step, the voltage of the battery is measured when the charge current is present. When the measured voltage of the battery is higher than the charge termination voltage, the step 218 will be executed.

Figure 4:
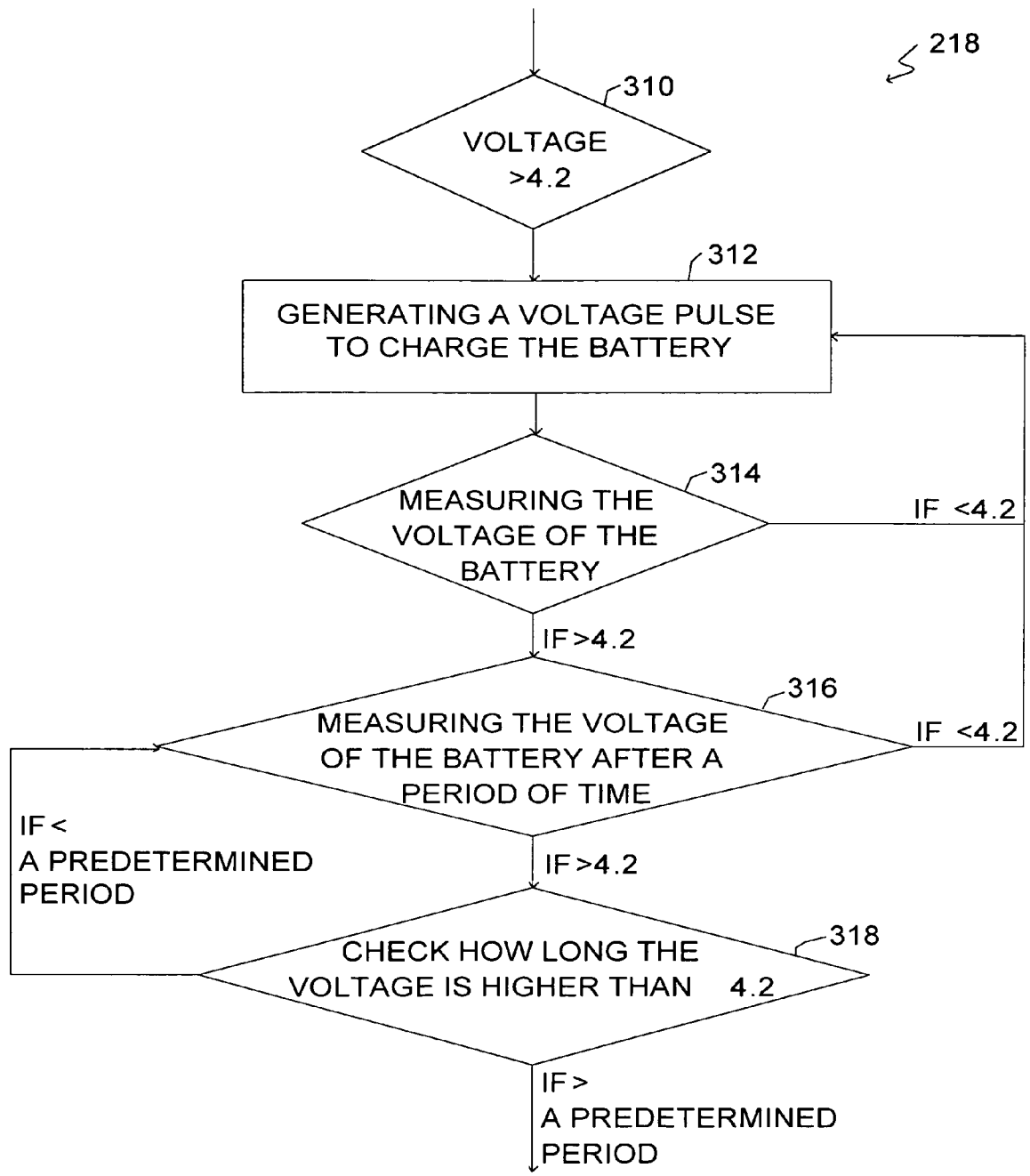
FIG. 4 is the diagram showing a method for pulsing charging a battery according to one embodiment of the present invention.

In the step 218, the battery is charged in Phase II, and a pulsing current will be applied to the battery. Referring to FIG. 4, the flowchart of the step 218 is illustrated according to the embodiment of the present invention. In a step 310 of the step 218, the measured voltage of the battery is compared with the charge termination voltage and a step 312 will be executed. According to an embodiment of the present invention, in the step 310, a periodic signal is generated. A number for counting the periods of the periodic signal, described below, is zeroed. In the step 312, a voltage pulse is generated to charge the battery. According to an embodiment of the present invention, a switch can be turned on to apply a voltage to the battery, and then turned off to stop charging the battery such that a voltage pulse can be generated to charge the battery.

In a step 314, after the voltage pulse, i.e., after turned of the switch, the voltage of the battery is measured. It should be noted that the voltage of the battery is measured when the charging current is substantially zero. If the measured voltage of the battery is lower than the charge termination voltage, the step 312 will be executed again, i.e., another voltage pulse will be generated to charge the battery. The step 312 and the step 314 are executed repeatedly until the measured voltage of the battery is higher than the charge termination voltage. Then in a step 316, the voltage of the battery will be measured after a certain period of time, such as 2 seconds. If the measured voltage of the battery is lower than the charge termination voltage, the step 312 will be executed again. If the measured voltage of the battery is higher than the charge termination voltage, the step 318 will be executed again. According to an embodiment of the present invention, in the step 316, the voltage of the battery is measured after a period of the periodic signal. The number for counting the periods of the periodic signal will add to one if the measured voltage is higher than the charge termination voltage. The number for counting the periods of the periodic signal will zeroed if the measured voltage is lower than the charge termination voltage.

In the step 318, the length or time of the measured voltage of the battery being higher than the charge termination voltage is measured. If the measured length is shorter than a predetermined period of time, such as 20 seconds, the step 316 will be executed again. If the measured length is longer than a predetermined period of time, such as 20 seconds, the battery is considered to be fully charged, the step 318 is done and the step 240 is executed to stop charging the battery. According to the embodiment of the present invention, in the step 318, the number for counting the periods of the periodic signal is compared with a predetermined number, such as 10. If the number is smaller than the predetermined number, the step 316 will be executed again. If the number is larger than the predetermined number, the step 240 is executed to stop charging the battery. It is understood that the number for counting the periods of the periodic signal represents the time of the measured voltage of the battery being higher than the charge termination voltage.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A method for charging a battery, comprising:
   charging said battery by an external power source via a switch;
   generating an output signal indicating whether a battery voltage of said battery is higher than a predetermined voltage;
   generating a signal having a plurality of pulses;
   generating a control signal according to said output signal and said plurality of pulses by a latch for controlling said switch;
   enabling said switch in response to said plurality of pulses and said control signal if said battery voltage is higher than said predetermined voltage;
   measuring a time period when said control signal remains substantially constant; and
   stopping charging said battery if said time period exceeds a first predetermined period of time.

2. The method of claim 1, further comprising:
   transferring said output signal to a data input of said latch; and
   transferring said plurality of pulses to a clock input of said latch.

3. The method of claim 1, further comprising:
   applying a voltage to said battery in response to said plurality of pulses of said signal.

4. The method of claim 1, further comprising:
   stopping charging said battery if said battery voltage is higher than said predetermined voltage for a second predetermined period of time.

5. The method of claim 1, further comprising:
   coupling a logic block to said latch for indicating a charging status,
   wherein said charging status comprises a presence of said external power source, charging, and charging termination.

6. The method of claim 1, wherein said plurality of pulses are periodic.

7. The method of claim 1, further comprising:
   coupling a bypass circuit in parallel to said switch; and
   charging said battery through said bypass circuit when said battery voltage of said battery is lower than a lower threshold voltage.

8. The method of claim 1, further comprising:
   measuring and remeasuring said battery voltage when a charging current is substantially zero.

9. The method of claim 5, further comprising:
   coupling a bi-directional switch to said logic block; and
   enabling said bi-directional switch by said logic block to supply energy from said battery to an external battery-driven device.

10. A system for charging a battery, comprising:
    a first comparator for determining whether a battery voltage of said battery is lower than a first predetermined voltage;
    a switch coupled to said first comparator for coupling an external power source to said battery;
    a timer coupled to said switch for generating a signal having a plurality of pulses;
    a latch for receiving an output from said first comparator and for receiving said signal from said timer, and for generating a control signal to control said switch; and
    a counter for measuring a time period when said control signal remains substantially constant,
    wherein said switch is enabled in response to said plurality of pulses of said signal and said control signal if said battery voltage of said battery is higher than said first predetermined voltage, and wherein said system stops charging said battery if said time period exceeds a predetermined period of time.

11. The system of claim 10, wherein a duty cycle ratio of said plurality of pulses is from about 60% to about 80%.

12. The system of claim 10, wherein said plurality of pulses of said signal are periodic.

13. The system of claim 10, further comprising:
    a second comparator for determining whether said battery voltage is lower than a second predetermined voltage;
    a precharger for charging said battery when said battery voltage is lower than said second predetermined voltage.

14. The system of claim 13, further comprising:
    a third comparator for determining whether said battery voltage is higher than a third predetermined voltage; and
    a stopping device for disabling said switch when said battery voltage is higher than said third predetermined voltage so as to protect said battery from overcharging.

15. The system of claim 10, further comprising:
    a discharging logic block for further enabling and disabling said switch for controlling discharging of said battery.

16. The system of claim 10, further comprising:
    a device for stating where whether said battery voltage of said battery has been over said predetermined voltage.

17. The system of claim 10, further comprising:
    a memory device for memorizing said battery voltage of said battery between said plurality of pulses for a certain period of time.

18. The system of claim 17, further comprising:
a state device coupled to said timer and said memory device to indicate a state of said system.

19. The system of claim 10, further comprising:
a bi-directional controller for enabling said switch when said external power source is removed from said switch and an external battery-driven device is coupled to said switch.

20. A method for charging a battery, comprising:
generating an output signal indicating whether a battery voltage of said battery is higher than a predetermined voltage;
charging said battery by a substantially continuous charging current via a switch until said battery voltage is higher than said predetermined voltage;
generating a discrete voltage having a plurality of voltage pulses;
generating a signal having a plurality of pulses;
charging said battery by said plurality of voltage pulses via said switch;
generating a control signal according to said output signal and said plurality of pulses by a latch for controlling said switch;
enabling said switch in response to said plurality of pulses of said signal and said control signal if said battery voltage is higher than said predetermined voltage;
measuring a time period when said control signal remains substantially constant; and
stopping charging said battery if said time period exceeds a first predetermined period of time.

21. The method of claim 20, further comprising:
transferring said output signal to a data input of said latch; and
transferring said plurality of pulses to a clock input of said latch.

22. The method of claim 20, further comprising:
periodically measuring said battery voltage during a low level of said plurality of voltage pulses; and
completing charging of said battery if said battery voltage is higher than said predetermined voltage for a second predetermined period of time.

23. The system as claimed in claim 10, wherein a data input of said latch is coupled to an output of said first comparator, and wherein a clock input of said latch is coupled to an output of said timer.

24. The system as claimed in claim 10, further comprising:
a flip-flop circuit coupled to an output of said first comparator and for latching an output of said flip-flop circuit to a first state when said battery voltage is higher than said first predetermined voltage.

25. The system as claimed in claim 24, wherein said flip-flop circuit latches said output of said flip-flop circuit to a second state when said battery voltage is lower than said first predetermined voltage.

* * * * *